United States Patent
Olariu et al.

(10) Patent No.: US 8,341,266 B2
(45) Date of Patent: Dec. 25, 2012

(54) METHOD AND SYSTEM FOR LOAD BALANCING OVER A SET OF COMMUNICATION CHANNELS

(75) Inventors: Gabriel L. Olariu, Germantown, MD (US); Roderick Ragland, Rockville, MD (US); Frank Kelly, Walkersville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 758 days.

(21) Appl. No.: 11/085,954

(22) Filed: Mar. 22, 2005

(65) Prior Publication Data

US 2006/0072452 A1 Apr. 6, 2006

Related U.S. Application Data

(60) Provisional application No. 60/616,471, filed on Oct. 6, 2004.

(51) Int. Cl.
*G06F 15/173* (2006.01)
*H04N 7/173* (2006.01)
*H04B 7/00* (2006.01)
*H04W 72/00* (2009.01)

(52) U.S. Cl. ........ 709/226; 725/95; 455/266; 455/452.1

(58) Field of Classification Search .................. 709/226; 725/95; 455/266, 452.1
See application file for complete search history.

(56) References Cited

U.S. PATENT DOCUMENTS

| | | | | |
|---|---|---|---|---|
| 5,537,394 | A * | 7/1996 | Abe et al. | 370/252 |
| 5,790,534 | A * | 8/1998 | Kokko et al. | 370/335 |
| 5,819,083 | A * | 10/1998 | Chen et al. | 1/1 |
| 5,898,681 | A * | 4/1999 | Dutta | 370/229 |
| 6,778,550 | B1 * | 8/2004 | Blahut | 370/443 |
| 7,062,556 | B1 * | 6/2006 | Chen et al. | 709/226 |
| 7,126,910 | B1 * | 10/2006 | Sridhar | 370/229 |
| 7,164,661 | B2 * | 1/2007 | Kelly | 370/323 |
| 7,339,953 | B2 * | 3/2008 | Widmer et al. | 370/477 |
| 7,656,813 | B2 * | 2/2010 | Kloper | 370/252 |
| 2002/0007490 | A1 * | 1/2002 | Jeffery | 725/78 |
| 2002/0083174 | A1 * | 6/2002 | Hayashi et al. | 709/225 |
| 2002/0156914 | A1 * | 10/2002 | Lo et al. | 709/238 |
| 2003/0016634 | A1 * | 1/2003 | Freedman et al. | 370/321 |
| 2003/0208523 | A1 * | 11/2003 | Gopalan et al. | 709/201 |
| 2005/0289618 | A1 * | 12/2005 | Hardin | 725/95 |
| 2006/0120282 | A1 * | 6/2006 | Carlson et al. | 370/229 |

OTHER PUBLICATIONS

Das, Sajal K. "A dynamic load balancing strategy for channel assignment selective borrowing in cellular mobile environment", Oct. 1997, Springer Netherlands, vol. 3 No. 5, pp. 1-15.*

* cited by examiner

*Primary Examiner* — Guang Li
(74) *Attorney, Agent, or Firm* — K&L Gates LLP

(57) ABSTRACT

An approach for load balancing is disclosed. A user load is determined based upon data queued for transmission at each of the terminals. In addition, an inroute load corresponding to loading of inroutes serving the terminals is determined. A user-to-inroute distribution that minimizes variation of the inroute load is generated. The user-to-inroute distribution maps the user load to the inroutes. The user load is reassigned to the inroutes based on the determined user-to-inroute distribution. This arrangement has particular applicability to a satellite network that provides data communication services.

20 Claims, 7 Drawing Sheets

METHOD AND SYSTEM FOR LOAD BALANCING OVER A SET OF COMMUNICATION CHANNELS

RELATED APPLICATIONS

This application is related to, and claims the benefit of the earlier filing date under 35 U.S.C. § 119(e) of, U.S. Provisional Patent Application (Ser. No. 60/616,471) filed Oct. 6, 2004, entitled "Optimal Load Balancing Over A Set of Independent Communication Channels Serviced by a Central Hub"; the entirety of which is incorporated herein by reference.

FIELD OF THE INVENTION

The present invention relates to communication systems, and more particularly to performing load balancing across communication channels.

BACKGROUND OF THE INVENTION

Communication service providers, from cable to cellular to satellite providers, are ever mindful of the performance and availability of their networks. One key aspect for ensuring high performance and high availability concerns how traffic is engineered. For instance, if certain communication circuits or channels are constantly over-loaded, while others are underutilized, the service provider incurs great costs. That is, because some circuits are oversubscribed, users assigned to these circuits will not have service, and yet, the system does have circuits that are hardly employed, resulting in wasted capacity. Further, this in effect unfairly blocks certain subscribers from obtaining network capacity. Accordingly, communication engineers have invested greatly in developing effective load balancing schemes. As the label suggest, load balancing spreads or equalizes the load across all channels or circuits so that no one channel is over-loaded or under-loaded. Because traffic load is dynamic, varying with time and application, developing a load balancing mechanism that is efficient and ensures fair access to network capacity is difficult.

Based on the foregoing, there is a clear need for improved approaches for load balancing.

SUMMARY OF THE INVENTION

These and other needs are addressed by the present invention, wherein an approach is provided for performing load balancing.

According to one aspect of the present invention, a method for providing load balancing in a communication system including a plurality of terminals is disclosed. The method includes determining a user load based upon data queued for transmission at each of the terminals. The method also includes determining an inroute load corresponding to loading of inroutes serving the terminals. The method further includes outputting a user-to-inroute distribution that minimizes variation of the inroute load, and reassigning the user load to the inroutes based on the determined user-to-inroute distribution.

According to another aspect of the present invention, an apparatus for providing load balancing in a communication system including a plurality of terminals is disclosed. The apparatus includes a memory configured to store a user load based upon data queued for transmission at each of the terminals. The memory is further configured to store an inroute load corresponding to loading of inroutes serving the terminals. The apparatus also includes a processor configured to output a user-to-inroute distribution that minimizes variation of the inroute load, wherein the user load is reassigned to the inroutes based on the determined user-to-inroute distribution.

According to another aspect of the present invention, a method for providing load balancing in a communication system including a plurality of terminals is disclosed. The method includes determining variance of loading of a plurality of communication channels, and outputting a load value that generates a maximum reduction in the variance. Additionally, the method includes identifying one of the terminals having a user load corresponding to the load value, and assigning the one terminal to the least loaded one of the communication channels . . .

According to yet another aspect of the present invention, a hub device for providing load balancing in a communication system including a plurality of terminals is disclosed. The system includes means for determining variance of loading of a plurality of communication channels, and means for outputting a load value that generates a maximum reduction in the variance. The system also includes means for identifying one of the terminals having a user load corresponding to the load value. The system further includes means for assigning the one terminal to the least loaded one of the communication channels.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, apparatus, and software for providing load balancing in a communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention provides an approach for balancing the user load across a set of communication channels. Using an iterative process, a change in channel load is determined that yields a maximum drop (or reduction) in variance of the channel load. The terminal with an individual user load that corresponds to the change is found, and reassigned (or moved) to the least loaded communication channel. Under this approach, the fair access to system capacity is guaranteed.

Although the present invention is discussed with respect to a satellite communication system, it is recognized by one of ordinary skill in the art that the present invention has applicability to any type of transport network, such as a DSL (Digital Subscriber Line) system or a cable network with a return channel.

Figure 1:
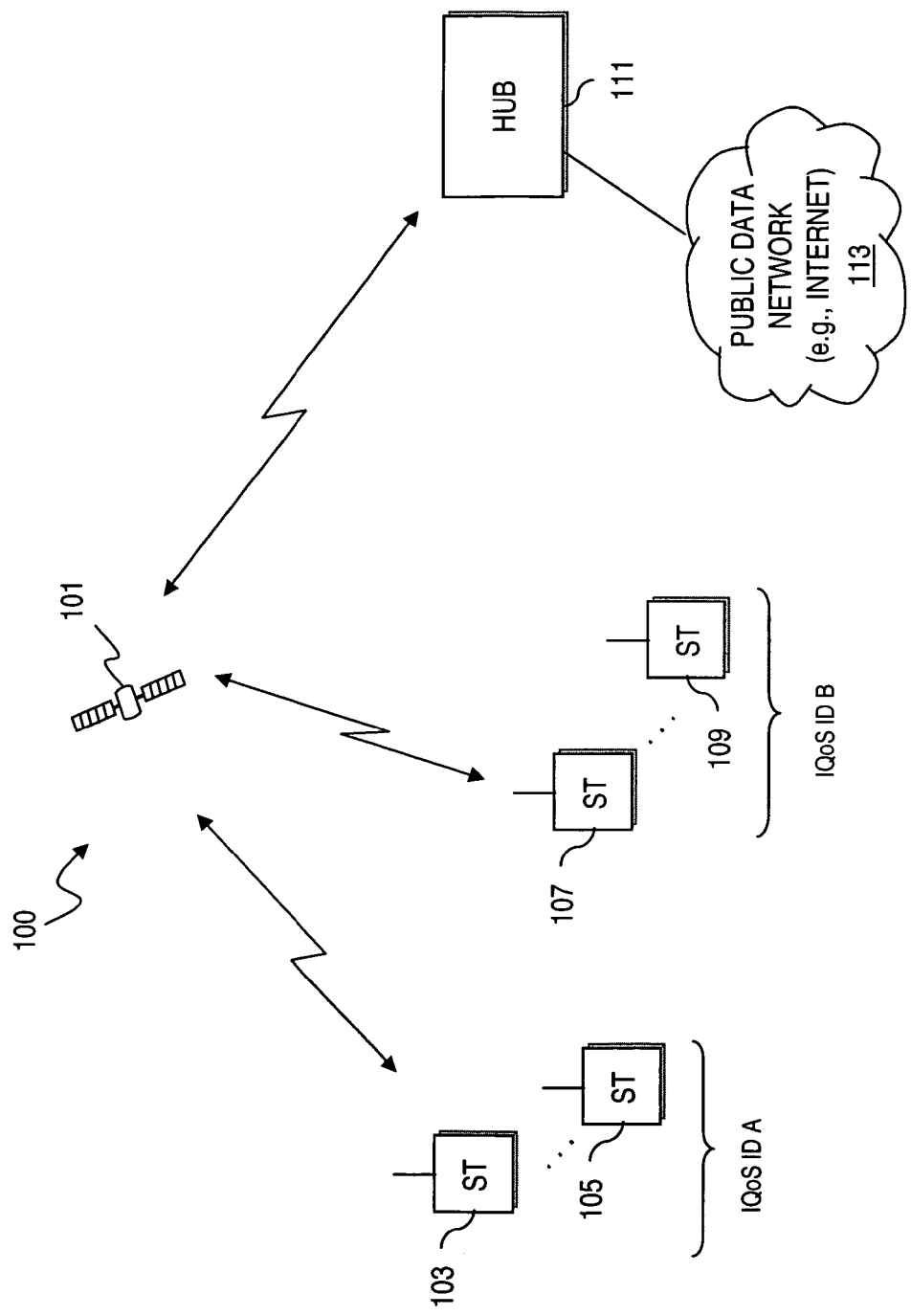
FIG. 1 is a diagram of a communication system capable of supporting load balancing of the communication channels, according to an embodiment of the present invention.

FIG. 1 is a diagram of a communication system capable of supporting load balancing of the communication channels, according to an embodiment of the present invention. A satellite communication system 100 utilizes a satellite 101 to transmit information, bi-directionally, to and from satellite terminals (STs) 103, 105, 107, 109 and a hub 111. In an exemplary embodiment, the STs 103, 105, 107, 109 are Very Small Aperture Terminals (VSAT), and can provide access to a public data network 113, such as the Internet. The hub 111 operates as part of a Network Operations Center (NOC).

Typically, the various STs 103, 105, 107, 109 are associated with different subscribers. By way of example, STs 103 and 105 are under control of Enterprise A, while STs 107 and 109 belong to Enterprise B. In the system 100, the STs 103, 105, 107, 109 originate traffic from a particular coverage area and may exchange data among themselves as well as other STs (not shown). Each of the terminals 103, 105, 107, 109 uses a contention channel to request bandwidth from the NOC 111, and thereafter transmits data over a collision free (stream) channel. At various points in time, each of the STs 103, 105, 107, 109 has data awaiting transmission; this data is considered the user load. At any given time, the STs 103, 105, 107, 109 can use a single stream channel. A channel load can be defined as a normalized sum of the individual user load.

Figure 2:
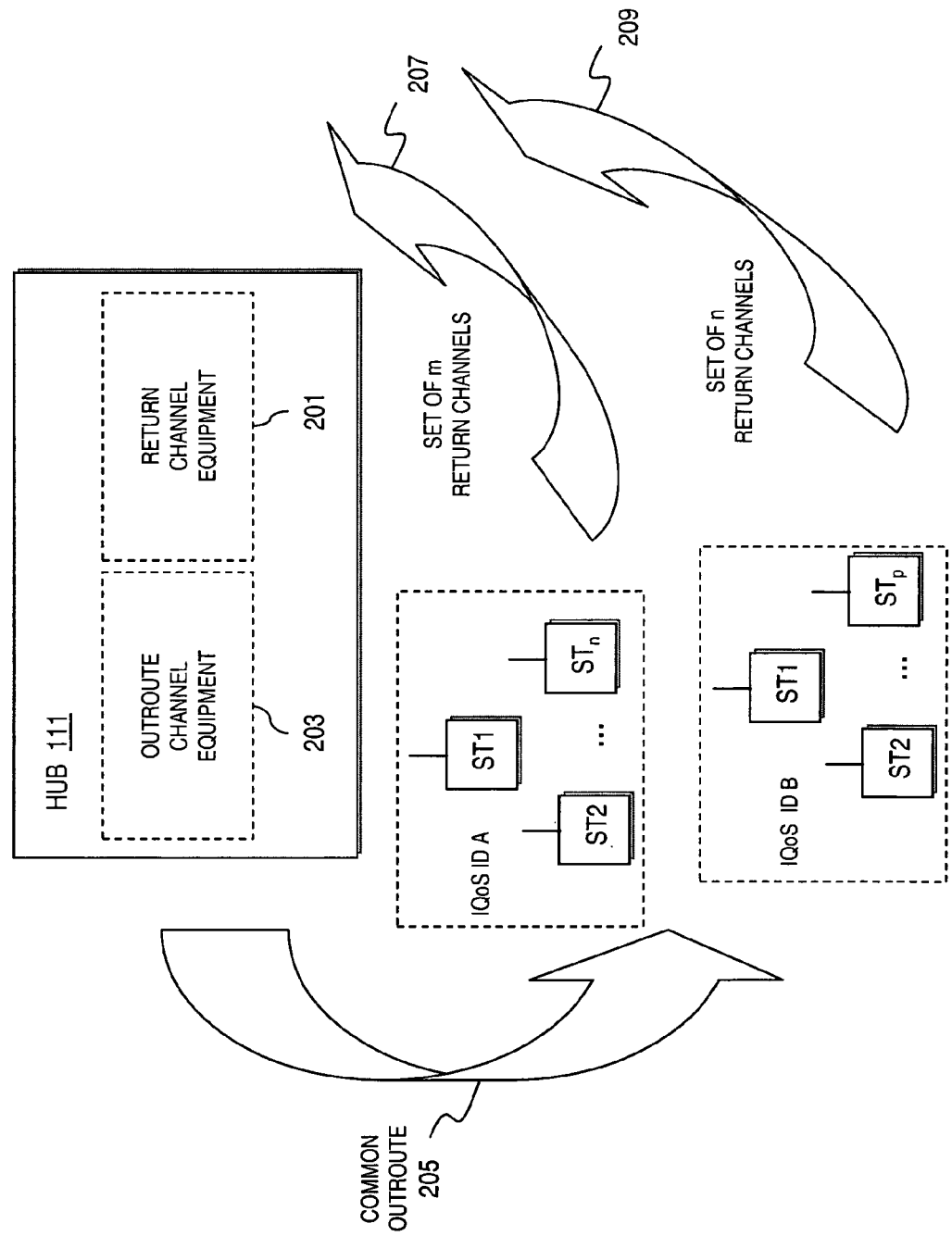
FIG. 2 is a diagram of an architecture of the hub in FIG. 1 for mapping return channel bandwidth to the terminals, according to an embodiment of the present invention.

According to one embodiment of the present invention, each subset of terminals 103, 105, 107, 109, is issued a unique Inroute Quality of Service Identifier (IQoS ID) as part of a service level agreement. Such an ID is configured in all the terminals that are commissioned, as well as in some of the equipment in the hub 111, e.g., return channel equipment (as shown in FIG. 2). Because each enterprise is likely to require the same quality of service level throughout the enterprise, the STs 103, 105 are assigned an IQoS ID A, and the STs 107, 109 are given an IQoS ID B. Return channel bandwidth is dynamically mapped to customer terminals through, in an exemplary embodiment, messages sent from the hub 111 on the outroute. As used herein, "return channel", "inroute", and "uplink channel" are synonymously used to denote a communication channel established via the satellite 101 to transport data in the direction from the STs 103, 105 to the satellite 101. The terms "receive channel", "outroute" and "downlink channel" refer to a communication channel carrying traffic in the direction from the satellite 101 to the STs 103, 105. The system 100 supports an inroute load balancing mechanism that ensures fair access by the STs 103, 105, 107, 109 to the inroutes; this mechanism is more fully described in FIGS. 3, 5A and 5B.

At commissioning, the STs 103, 105, 107, 109 are configured with a set of parameters (which include the IQoS ID) required to access the resource. The hub 111 is responsible for allocating inroute bandwidth, and can do so without any knowledge of the identity of the users that are capable of using the system's resources. This capability enhances scalability in the system 100. Also, the system 100 is secured against unauthorized use through advanced encryption methods, as explained below.

Additionally, the system 100 can allow for continuous utilization of the network inroute resources (inroutes or return channels) by multiplexing users of different enterprises on the same set of return channels. The return channel can include multiple carriers, each operating at speeds, for example, of 64 kbps, 128 kbps, or 256 kbps. Each of these carriers is a TDMA (Time Division Multiple Access) stream, which employs several transmission schemes.

The NOC 111 manages and controls communication services and operations. For example, the NOC 111 provisions and identifies the communication channels that are to be allocated. Additionally, the NOC 111 is responsible for controlling the bandwidth that is made available to the STs 103, 105, 107, 109.

Bandwidth on any inroute group (set of inroutes) is available to any terminal that is able to use it. In other words, the STs 103, 105, 107, 109 are totally trusted. The hub 111 does not need to perform the admission control function, or have knowledge of permissible or authorized terminals, as the information, e.g., IQoS ID, is securely loaded into the terminals. This approach provides the advantage that the network of STs 103, 105, 107, 109 can be expanded without any change in the configuration of the return channel equipment within the hub 111.

FIG. 2 is a diagram of an architecture of the hub of FIG. 1 for mapping return channel bandwidth to the satellite terminals, according to an embodiment of the present invention. As shown, the hub 111 of the system 100 includes return channel equipment 201 for interfacing with return channels, as well as outroute channel equipment 203 to transmit signals over an outroute 205 to the terminals associated with IQoS ID A and IQoS ID B. In this example, the outroute 205 is a common channel. By contrast, the terminals utilize different sets of return channels, according to the assigned IQoS ID. Specifically, Enterprise A with IQoS ID A employs a set of m return channels 207, and Enterprise B with IQoS ID B transmits over a set of n return channels 209.

In this example, Enterprise A has n terminals ($ST_1, \ldots, ST_n$), where each terminal is configured with IQoS ID A. Similarly, Enterprise B has p terminals ($ST_1, \ldots, ST_p$), each with identifier, IQoS ID B. The hub 111 associates the sets of return channels with the respective identifiers and advertises this mapping via the common outroute 205, using a dedicated outroute messaging protocol. Each set (group) of inroutes is uniquely identified within the system 100 through the identifier.

As previously mentioned, the system 100 can improve utilization of the return channels by multiplexing traffic from terminals associated with different IQoS IDs upon a common set of return channels. This approach thus provides a higher return on investment for the service provider of the system 100 by associating multiple enterprises with the same set of inroutes. Each enterprise is guaranteed a minimum amount of return channel bandwidth and can use more if available (not used by the other parties).

For the purposes of explanation, it is assumed that enterprises l and k are sharing the same set of return channels (where k>l); i.e., that of group m. The mapping can be simply represented as a triplet (l, k, m). In an exemplary embodiment, the first two symbols in the triplet represent the start and end of a sorted range of IQoS IDs. Enterprises with IQoS IDs in this range have bandwidth dedicated on inroute group m. Under this scenario, the range is simple, containing only two IQoS IDs. Depending on the amount of bandwidth available on the inroute group and the customer requirements, this range can identify one or more enterprises. Maximum benefits in terms of inroute performance are achieved by identifying enterprises with diverse usage patterns and mapping them to the same set of inroutes.

An enterprise can add more sites and can use the service as soon as the newly installed terminals are correctly configured with the proper IQoS ID. This approach scales up easily because it does not involve any configuration change for the return channel equipment 201 (FIG. 2) of the hub 111.

Figure 3:
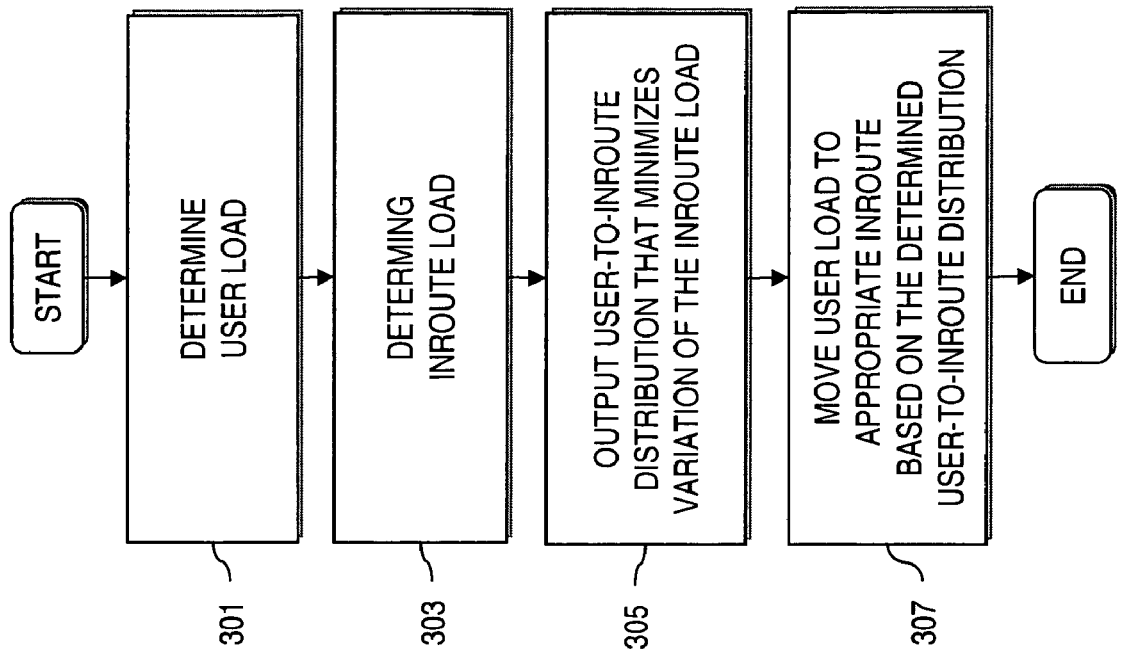
FIG. 3 is a flowchart of a load balancing process, in accordance with an embodiment of the present invention.

FIG. 3 is a flowchart of a load balancing process, in accordance with an embodiment of the present invention. In the system 100, the user load (or backlog) collectively generated by the STs 103, 105, 107, 109 impacts the loading on the inroutes; these user and inroute loads vary with time. It is recognized that the load should exhibit very small variations across inroutes of the same inroute group or across inroutes shared by the users of the same IQoS plan as appropriate for the system state. The inroute load balancing mechanism is invoked when, for example, all IQoS plans are either under-loaded or over-loaded. This mechanism involves determining the user load and the inroute load, per steps 301 and 303.

Load balancing of the inroutes can be viewed as an optimization problem, whereby a finite number of steps are executed to determine the user-to-inroute distribution that minimizes the variation of the inroute load (step 305). In step 307, the user load is moved (or reassigned) to an appropriate inroute based on the determined user-to-inroute distribution. In other words, the load balancing process determines a set of users to be moved and a set of target inroutes such that the variation of the inroute load is minimized.

The above process advantageously improves the static inroute assignment as well as the performance of the real time inroute allocation process. Specifically, the process provides an efficient method of assigning bandwidth in a TDMA network, yet still provides bandwidth on demand to enterprise customers who are paying a premium for guaranteed bandwidth.

Figure 4:
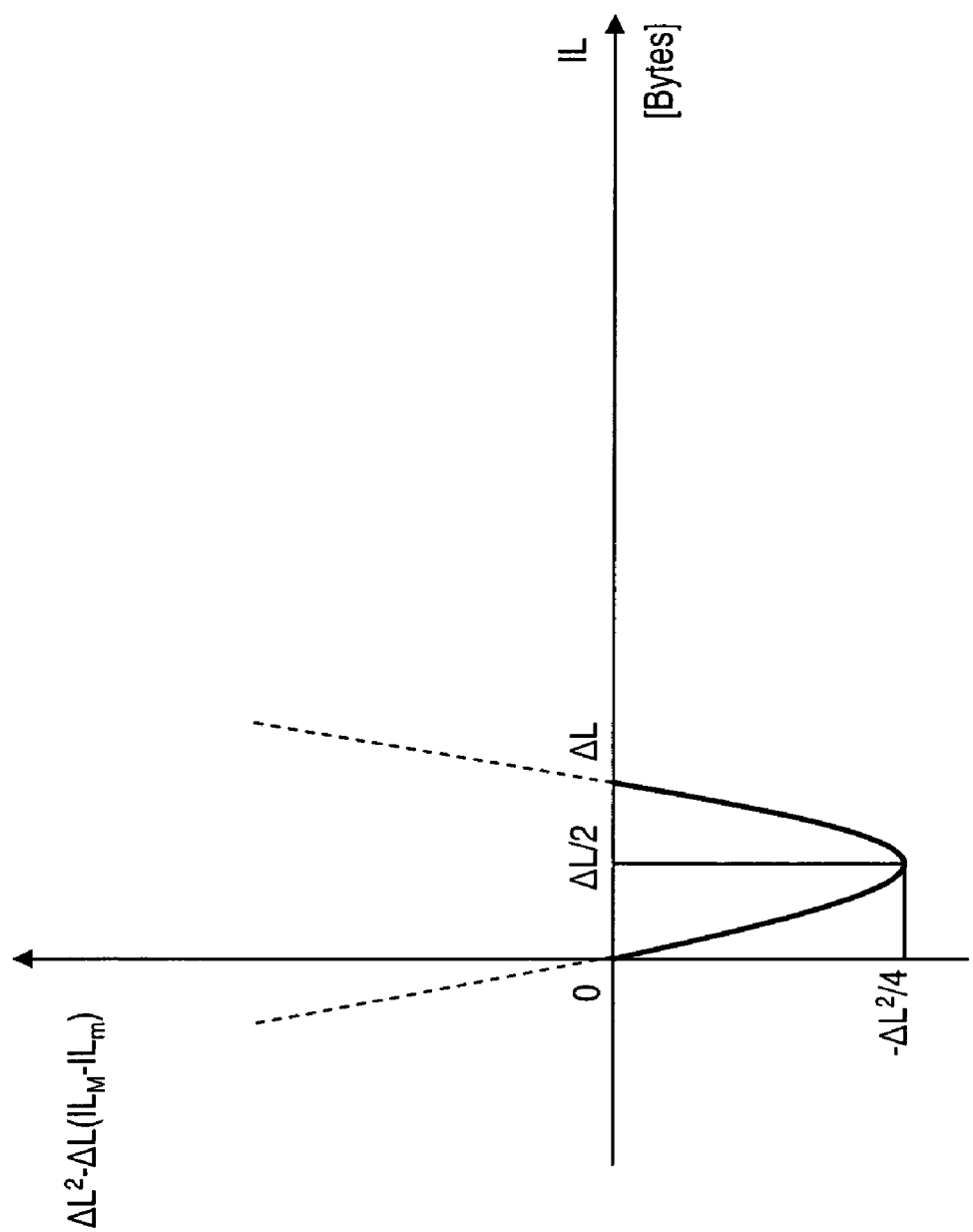
FIG. 4 is a graph showing the variation of the inroute load variance as a function of the load associated with a terminal that switches inroutes.

FIG. 4 is a graph showing the variation of the inroute load variance as a function of the load associated with a terminal that switches inroutes. For the purposes of explanation, the notations of Table 1 are adopted. The graph shows the variance variation with $\Delta L$, and is further explained with respect to FIGS. 5A and 5B.

TABLE 1

| VARIABLE | DEFINITION |
| --- | --- |
| Var(IL) | Variation of the inroute load (IL) vector |
| M(IL) | Arithmetic mean of the inroute load vector |
| $\Delta L$ | Load of the user that is moved to a different inroute |
| N | Number of active, stream inroutes in the inroute load vector |
| $IL_m$ | The inroute with minimum load in a sorted IL vector |
| $IL_M$ | The inroute with maximum load in a sorted IL vector |

Figure 5A:
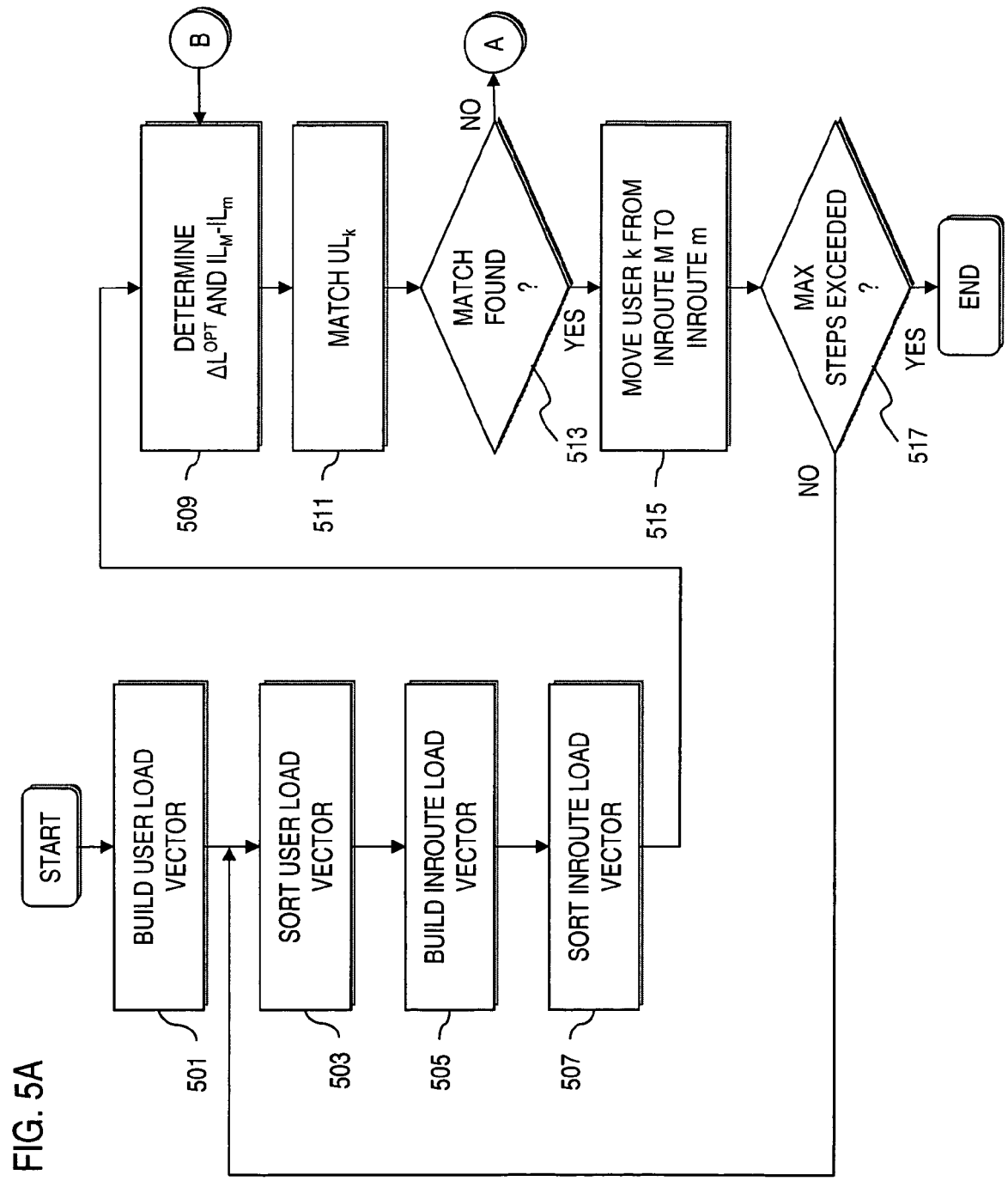
FIGS. 5A and 5B are a flowchart of a load balancing process that minimizes load variance using load vectors, in accordance with an embodiment of the present invention.
Figure 5B:
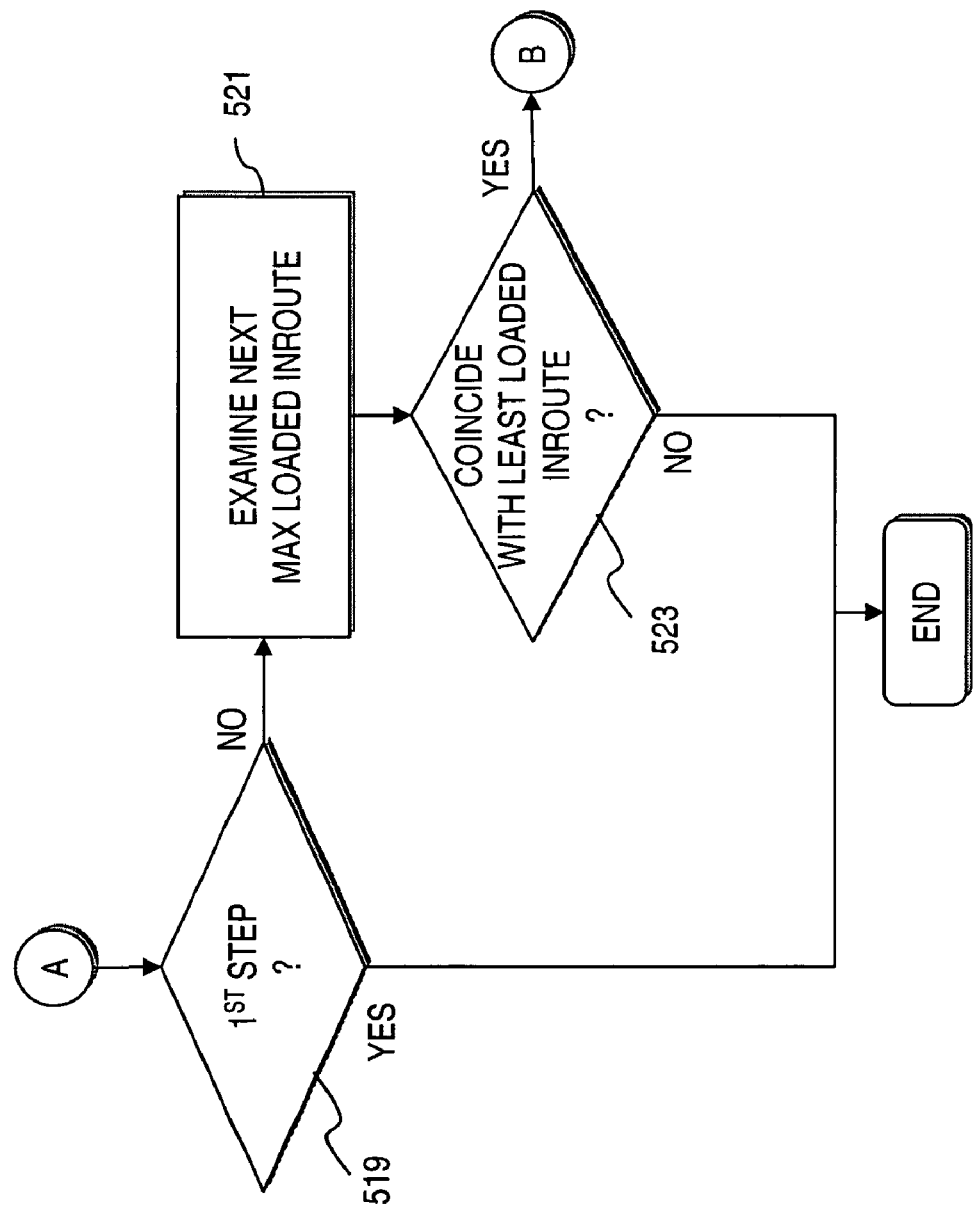

FIGS. 5A and 5B are a flowchart of a load balancing process that minimizes load variance using load vectors, in accordance with an embodiment of the present invention. The inroute load balancing process aims to pass some of the load from the most loaded inroute to the least loaded inroute. This solves the problem of the target inroute: sorting the inroute load vector (IL) identifies the inroutes with the least load. Next, the process determines the user that needs to be moved and by that, guarantees a decrease in the variance of the inroute load vector.

In steps 501-507, the user load vector (UL) and the inroute load vector are built and sorted. The process determines the mean and initial variance of the inroute load vector according to the following equations:

$$M(IL) = \frac{1}{N}\sum_{k=0}^{N-1} IL_k, \quad \text{Eq. (1)}$$

$$Var_0(IL) = \frac{1}{N}\sum_{k=0}^{N-1} (IL_k - M)^2. \quad \text{Eq. (2)}$$

With a sorted inroute load vector such that M=0 and m=N−1 and moving the delta load ($\Delta L$) from M to m, the new variance can be re-written:

$$\begin{aligned} Var_p(IL) &= \frac{1}{N-1}[(IL_M - \Delta L - M)^2 + \\ &\quad (IL_m + \Delta L - M)^2 + \sum_{k=1}^{N-2}(IL_k - M)^2] \\ &= \frac{1}{N-1}\left\{2\Delta L[\Delta L - (IL_M - IL_m)] + \sum_{k=1}^{N-2}(IL_k - M)^2\right\} \\ &= \frac{1}{N-1}\sum_{k=0}^{N-1}(IL_k - M)^2 + \frac{2\Delta L}{N-1}[\Delta L - (IL_M - IL_m)] \\ &= Var_{p-1}(IL) + \frac{2\Delta L}{N-1}[\Delta L - (IL_M - IL_m)]. \end{aligned} \quad \text{Eq. (3)}$$

The index p for the variance signifies that the above calculation is part of a finite step optimization cycle. The mean of the inroute load vector does not change. At every step, the objective is to find the delta load ($\Delta L$) that leads to the maximum reduction in variance (step 509). Once this value is determined, the process performs a match between the delta load and the load of a particular user on that inroute, as in step 511. If a match is found (per step 513), then the user is moved from the maximum to the minimum loaded inroute, as in step 515. The values of $\Delta L$ that lead to a decrease in variance are found left of $IL_M-IL_m$. The optimal $\Delta L$ is halfway to $IL_M-IL_m$, as seen in FIG. 4, and equation (5) below:

$$0 < \Delta L < IL_M - IL_m, \quad \text{Eq. (4)}$$

$$\Delta L^{opt} = \frac{IL_M - IL_m}{2}, \quad \text{Eq. (5)}$$

$$\Delta Var^{opt} = (\Delta L^{opt})^2. \quad \text{Eq. (6)}$$

The process needs to execute in a finite number of steps, since the collection interval is not infinite. Thus, the following stop conditions are considered. First, the process can cease execution if a maximum number of steps have been reached (as checked in step 517): this is most likely to happen on highly and diversely loaded systems. Second, if a qualified $\Delta L$ cannot be found, then the process halts: lightly loaded systems are prone to exhibit this behavior. If this condition holds from the very first step of the algorithm, the highest loaded inroute is replaced by the next highest and the detection of a ΔL is repeated. The above conditions are seen in steps 517-523.

The process described above provides a load balancing mechanism for the system 100 to improve the inroute allocation process. The processes detailed above can be executed through a variety of hardware and/or software configurations.

Figure 6:
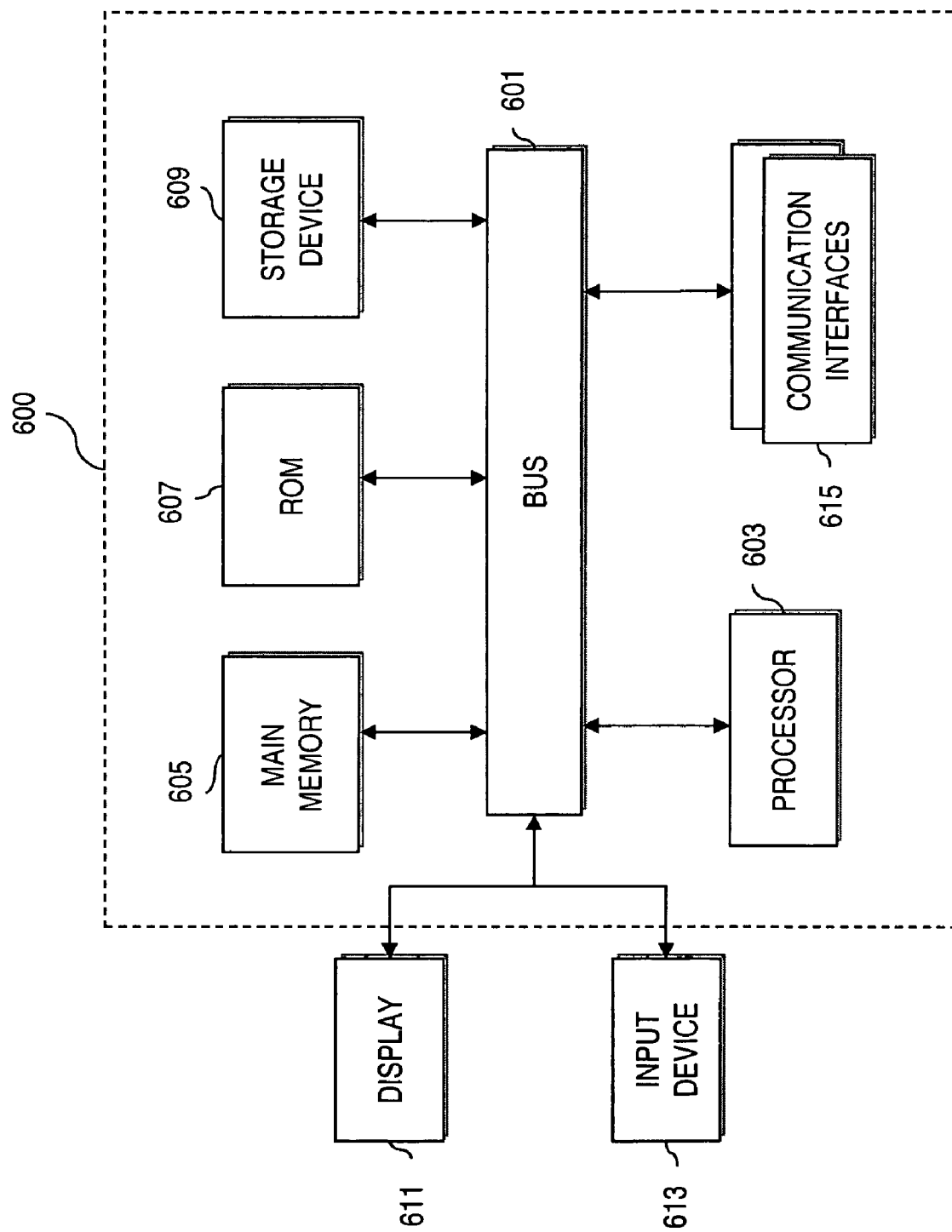
FIG. 6 is a diagram of hardware that can be used to implement an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, the processes of FIGS. 3, 5A and 5B are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging an application program for implementing an embodiment of the present invention through the network 625, local network 621 and communication interface 617. The processor 603 may execute the transmitted code while being received and/or store the code in storage device 69, or other non-volatile storage for later execution. In this manner, computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the above approach provides for balancing the user load across a set of communication channels. Using an iterative process, a change in channel load is determined that yields a maximum drop in variance of the channel load. The terminal with an individual user load that corresponds to the change is found, and reassigned (or moved) to the least loaded communication channel. Under this approach, the fair access to system capacity is guaranteed.

While the present invention has been described in connection with a number of embodiments and implementations, the present invention is not so limited but covers various obvious modifications and equivalent arrangements, which fall within the purview of the appended claims.

What is claimed is:

1. A method for providing load balancing in a communication system including a plurality of terminals, the method comprising:
   determining a user load based upon data queued for transmission at each of the terminals;
   generating a user load vector based on the user load;
   sorting the user load vector to identify a more loaded terminal;
   determining an inroute load corresponding to loading of inroutes serving the terminals;
   generating an inroute load vector based on the inroute load;
   sorting the inroute load vector to determine a less loaded inroute;
   determining variance of the inroute load vector;
   determining a load change for a maximum reduction in the variance of the inroute load vector;
   determining a first terminal with a load that matches the load change based on the user load vector;
   outputting a user-to-inroute distribution that minimizes variation of the inroute load, the user-to-inroute distribution mapping the user load to the inroutes; and
   reassigning the user load to the inroutes based on the determined user-to-inroute distribution from a central hub including moving the load of the first terminal to the less loaded inroute, wherein
   the reassignment of the user load to the inroutes is independent of decisions at the terminals and allocation and redistribution of bandwidth is obtained at the plurality of terminals without an externally provided command.

2. The method according to claim 1, wherein the terminals are associated with a common Quality of Service (QoS) level.

3. The method according to claim 1, wherein
   the more loaded terminal is the most loaded terminal; and
   the less loaded inroute is the least loaded inroute.

4. The method according to claim 3, wherein the communication system is a satellite network.

5. The method according to claim 4, wherein the inroutes are Time Division Multiple Access (TDMA) streams.

6. A non-transitory computer-readable storage medium having instructions providing load balancing in a communication system including a plurality of terminals, the instruction executable to cause one or more processors to perform the following:
   determining a user load based upon data queued for transmission at each of the terminals;
   generating a user load vector based on the user load;
   sorting the user load vector to identify a more loaded terminal;
   determining an inroute load corresponding to loading of inroutes serving the terminals;
   generating an inroute load vector based on the inroute load;
   sorting the inroute load vector to determine a less loaded inroute;
   determining variance of the inroute load vector;
   determining a load change for a maximum reduction in the variance of the inroute load vector;
   determining a first terminal with a load that matches the load change based on the user load vector;
   outputting a user-to-inroute distribution that minimizes variation of the inroute load, the user-to-inroute distribution mapping the user load to the inroutes; and
   reassigning the user load to the inroutes based on the determined user-to-inroute distribution from a central hub including moving the load of the first terminal to the less loaded inroute, wherein
   the reassignment of the user load to the inroutes is independent of decisions at the terminals and allocation and redistribution of bandwidth is obtained at the plurality of terminals without an externally provided command.

7. An apparatus for providing load balancing in a communication system including a plurality of terminals, the apparatus comprising:
   a memory configured to store a user load based upon data queued for transmission at each of the terminals, the memory being further configured to store an inroute load corresponding to loading of inroutes serving the terminals; and
   a processor configured to:
      generate a user load vector based on the user load, sort the user load vector to identify a more loaded terminal,
      generate an inroute load vector based on the inroute load;
      sort the inroute load vector to determine a less loaded inroute;
      determine variance of the inroute load vector;
      determine a load change for a maximum reduction in the variance of the inroute load vector;
      determine a first terminal with a load that matches the load change based on the user load vector
      output a user-to-inroute distribution that minimizes variation of the inroute load, the user-to-inroute distribution mapping the user load to the inroutes,
   wherein the user load is reassigned to the inroutes based on the determined user-to-inroute distribution, including moving the load of the first terminal to the less loaded inroute, and independent of decisions at the terminals, and allocation and redistribution of bandwidth is obtained at the plurality of terminals without an externally provided command.

8. The apparatus according to claim 7, wherein the terminals are associated with a common Quality of Service (QoS) level.

9. The apparatus according to claim 7, wherein
   the more loaded terminal is the most loaded terminal; and
   the less loaded inroute is the least loaded inroute.

10. The apparatus according to claim 9, wherein the communication system is a satellite network.

11. The apparatus according to claim 10, wherein the inroutes are Time Division Multiple Access (TDMA) streams.

12. A method for providing load balancing in a communication system including a plurality of terminals, the method comprising:
- generating at least one load vector for a plurality of communication channels based on at least one of a user load based upon data queued for transmission and an inroute load corresponding to loading of inroutes serving the terminals;
- sorting the at least one load vector to identify at least one of a more loaded terminal and a less loaded inroute;
- determining variance of the at least one load vector;
- determining a load change for a maximum reduction in the variance of the at least one load vector;
- outputting a load value that generates a maximum reduction in the variance;
- identifying a first terminal having a user load corresponding to the load value; and
- causing a central hub to assign the first terminal to the less loaded inroute to move the load of the first terminal to the less loaded inroute independent of any decision by the terminal, wherein
- allocation and redistribution of bandwidth is obtained at the plurality of terminals without an externally provided command.

13. The method according to claim 12, wherein the terminals are associated with a common Quality of Service (QoS) level.

14. The method according to claim 12, wherein the communication system is a satellite network.

15. The method according to claim 14, wherein the inroutes are Time Division Multiple Access (TDMA) streams.

16. A non-transitory computer-readable storage medium having instructions providing load balancing in a communication system including a hub communicating with a plurality of terminals, the instructions executable to cause one or more processors to perform the following:
- generating at least one load vector for a plurality of communication channels based on at least one of a user load based upon data queued for transmission and an inroute load corresponding to loading of inroutes serving the terminals;
- sorting the at least one load vector to identify at least one of a more loaded terminal and a less loaded inroute;
- determining variance of the at least one load vector;
- outputting a load value that generates a maximum reduction in the variance;
- identifying a first terminal having a user load corresponding to the load value; and
- causing the central hub to assign the first terminal to the less loaded inroute to move the load of the first terminal to the less loaded inroute independent of any decision by the terminal, wherein
- allocation and redistribution of bandwidth is obtained at the plurality of terminals without a command provided by the hub.

17. A hub device for providing load balancing in a communication system including a plurality of terminals, the system comprising:
- means for generating at least one load vector for a plurality of communication channels based on at least one of a user load based upon data queued for transmission and an inroute load corresponding to loading of inroutes serving the terminals;
- means for sorting the at least one load vector to identify at least one of a more loaded terminal and a less loaded inroute;
- means for determining variance of the at least one load vector;
- means for determining a load change for a maximum reduction in the variance of the at least one load vector;
- means for outputting a load value that generates a maximum reduction in the variance;
- means for identifying a first terminal having a user load corresponding to the load value; and
- means for assigning the first terminal to the less loaded inroute to move the load of the first terminal to the less loaded inroute independent of any decision by the terminal, wherein
- allocation and redistribution of bandwidth is obtained at the plurality of terminals without a command provided by the hub.

18. The device according to claim 17, wherein the terminals are associated with a common Quality of Service (QoS) level.

19. The device according to claim 17, wherein the communication system is a satellite network.

20. The device according to claim 19, wherein the inroutes are Time Division Multiple Access (TDMA) streams.

* * * * *